(12) United States Patent
Bratton et al.

(10) Patent No.: US 11,275,196 B2
(45) Date of Patent: Mar. 15, 2022

(54) OBJECT DETECTION SYSTEM AND METHOD

(71) Applicant: The Chamberlain Group LLC, Oak Brook, IL (US)

(72) Inventors: Paul D. Bratton, Minneapolis, MN (US); Michael Joseph Davies, Woodridge, IL (US); Scott E. Gavett, Shoreview, MN (US)

(73) Assignee: The Chamberlain Group LLC, Oak Brook, IL (US)

( * ) Notice: Subject to any disclaimer, the term of this patent is extended or adjusted under 35 U.S.C. 154(b) by 0 days.

(21) Appl. No.: 16/811,176

(22) Filed: Mar. 6, 2020

(65) Prior Publication Data

US 2020/0284943 A1    Sep. 10, 2020

Related U.S. Application Data

(60) Provisional application No. 62/815,759, filed on Mar. 8, 2019.

(51) Int. Cl.
*G01V 8/14* (2006.01)

(52) U.S. Cl.
CPC ...................... *G01V 8/14* (2013.01)

(58) Field of Classification Search
CPC .............. G01V 8/14; G01V 8/12; G01V 8/20
See application file for complete search history.

(56) References Cited

U.S. PATENT DOCUMENTS

| | | | |
|---|---|---|---|
| 4,710,759 A | 12/1987 | Fitzgibbon | |
| 4,736,097 A * | 4/1988 | Philipp | G01V 8/20 250/205 |

(Continued)

FOREIGN PATENT DOCUMENTS

| | | |
|---|---|---|
| JP | 2012247410 | 12/2012 |
| JP | 5317004 | 10/2013 |

(Continued)

OTHER PUBLICATIONS

International Search Report and Written Opinion; Corresponding PCT Patent Application No. PCT/US2020/021328 dated Sep. 23, 2020; 13 pages.

(Continued)

*Primary Examiner* — Thanh Luu
*Assistant Examiner* — Monica T Taba
(74) *Attorney, Agent, or Firm* — Fitch, Even, Tabin & Flannery LLP

(57) ABSTRACT

In one aspect, an object detection system is provided that adapts to the distance between the emitter and receiver. The system may utilize a range determining operation whereby the receiver will adjust an operation threshold, such as the detected signal strength required for the receiver to indicate that no object is present. The system may increase the threshold of the receiver as the strength of the received signal from the emitter increases, and upon certain conditions, decrease the threshold of the receiver as the strength of the received signal decreases. The system may utilize different receiver thresholds corresponding with different distance ranges between the emitter and receiver. By increasing the threshold of the receiver, the system may disregard low-level reflected light, thereby avoiding ignoring legitimate obstructions, while allowing the system to operate reliably over a wide physical range between the emitter and receiver.

46 Claims, 8 Drawing Sheets

(56) References Cited

U.S. PATENT DOCUMENTS

| | | | |
|---|---|---|---|
| 6,472,997 B2 * | 10/2002 | Leen | G08B 13/19 |
| | | | 340/541 |
| 7,157,689 B1 | 1/2007 | Schmidt | |
| 7,616,895 B2 | 11/2009 | Leeser | |
| 9,587,420 B2 | 3/2017 | Keller, Jr. et al. | |
| 10,156,634 B2 | 12/2018 | Fitzgibbon | |
| 2003/0155488 A1 | 8/2003 | Olson | |
| 2003/0193304 A1 * | 10/2003 | Fitzgibbon | E05F 15/668 |
| | | | 318/282 |
| 2014/0152539 A1 * | 6/2014 | Cai | G06F 3/017 |
| | | | 345/156 |
| 2018/0060127 A1 * | 3/2018 | Esterkin | G06F 11/302 |
| 2018/0131449 A1 * | 5/2018 | Kare | H01S 5/06216 |
| 2019/0162874 A1 * | 5/2019 | Mestieri | G01S 7/4868 |

FOREIGN PATENT DOCUMENTS

| | | | |
|---|---|---|---|
| JP | 2013213680 | | 10/2013 |
| JP | 2013213680 A | * | 10/2013 |
| KR | 1020180049934 | | 5/2018 |

OTHER PUBLICATIONS

"Product Overview: Photoelectric Sensors For Automation Technology," Pepperl+Fuchs, 36 pages.

Mistele, Thomas et al., "Choosing an Infrared Receiver Based on AGC Type," Wireless Design & Development, Nov. 2008, pp. 24-25.

* cited by examiner

OBJECT DETECTION SYSTEM AND METHOD

CROSS-REFERENCE TO RELATED APPLICATION

This application claims the benefit of U.S. Provisional application No. 62/815,759, filed Mar. 8, 2019, entitled Object Detection System and Method which is incorporated by reference in its entirety herein.

TECHNICAL FIELD

This disclosure relates generally to detecting the presence of an object and, more particularly, relates to an object detection system and method for detecting the presence of an obstacle in the path of a movable barrier.

BACKGROUND

Movable barrier operators generally serve to selectively move a movable barrier (such as a sectional or one-piece garage door, swinging gate, sliding gate, rolling shutter, and so forth) between an opened and a closed position using one or more motors. Movable barrier operators may take a variety of forms, including trolley-based garage door openers, jackshaft operators, and gate operators as some examples. In addition to integral object detection methods or techniques (e.g. using sensors/sensing of force, torque, electrical current, power, etc.) it is known to use secondary devices such as object detection systems to detect an obstacle in the path of the moving barrier through use of light, sound, radio-frequency, and/or contact sensing mechanisms. Upon sensing an obstacle, the object detection system provides a signal that can be used by the movable barrier operator to avoid potentially harmful contact between the movable barrier and the detected obstacle. For example, the movable barrier operator may respond by preventing barrier movement or stopping and/or reversing barrier movement. These object detection systems aid in ensuring that the movable barrier can be moved without undue risk to persons or property in the immediate vicinity.

One example of an object detection system is a photobeam system. Generally speaking, these photobeam systems include an emitter, which emits light, and a receiver or detector, which detects the light emitted by the emitter. In "thru-beam" systems, the emitter and the receiver are on opposite sides of the movable barrier. In "retro-reflective" systems, the emitter and the receiver are on the same side of the movable barrier with the opposing side having a reflective surface that reflects the emitted signal back to the receiver. Typically, the emitter emits infrared (IR) light, which is not visible to the human eye.

The components of a photobeam system are generally configured near the floor and the path of travel of the movable barrier. The emitter and receiver of a photobeam system may be placed at a wide variety of distances apart from one another, depending on the width of the movable barrier. Some photobeam systems have automatically or manually adjustable gain settings to compensate for the distance between the emitter and receiver. For example, the higher the gain, the better range and immunity to adverse weather the photobeam system will have. In the case of a manually adjustable system, the gain is to be set by a user or installer at the time of installation. Often a user will set the sensitivity to its highest level to achieve the best range possible. In the case of an automatically adjustable system, the system itself may increase the gain of the system, such as by increasing the intensity of light emitted, e.g. in microwatts per $cm^2$, if the received signal strength is detected to be low, such as when an obstruction partially blocks the beam. However, if the gain is set too high but the distance between the receiver and emitter is moderate to short, the system may fail to detect legitimate obstructions. For example, under certain conditions, emitted light from the emitter can refract or reflect from a legitimate obstruction, to other nearby objects, and be received at the detector, causing the detector to indicate to the movable barrier operator that no obstruction is present, thereby causing the system to ignore the obstruction.

Figure 1:
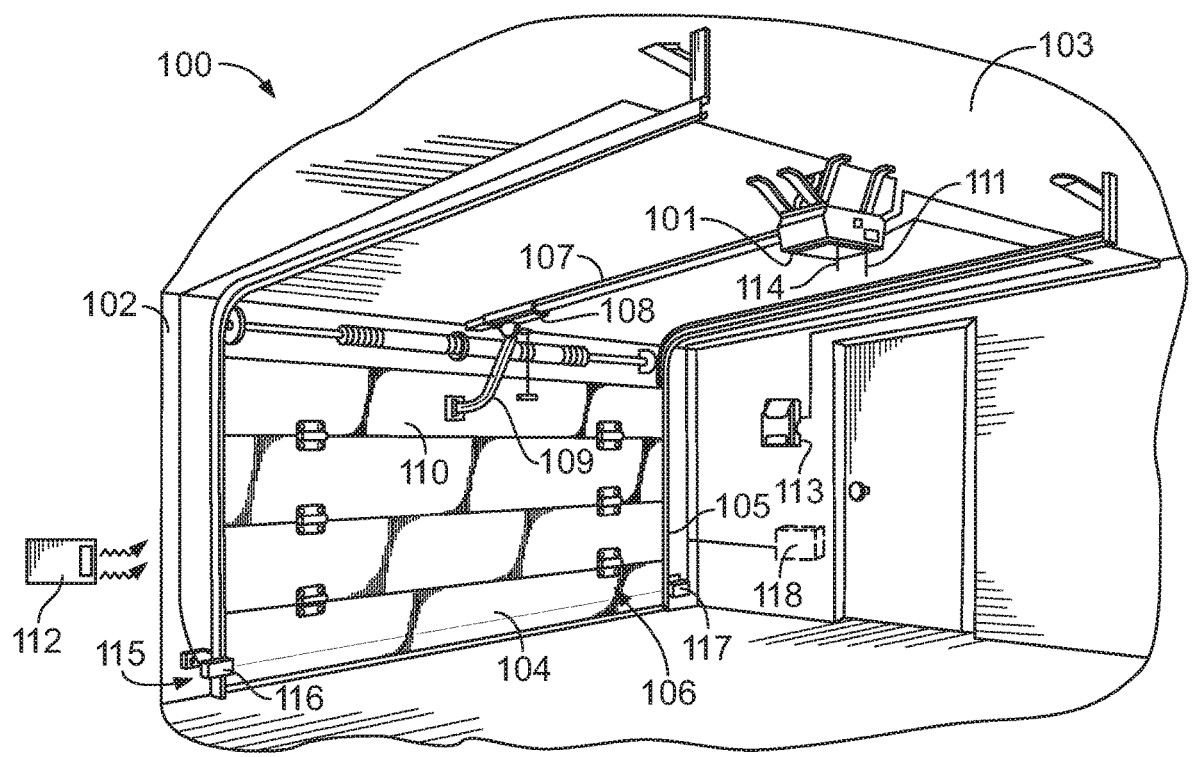
FIG. 1 is a perspective view of an example object detection system adjacent a movable barrier and in communication with a movable barrier operator system associated with the movable barrier.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure; an object detection system is provided that automatically adapts to the distance at which the emitter and receiver are installed from one another. In one embodiment, the system utilizes a multi-step range determining operation whereby the receiver will adjust an operation threshold, such as the detected signal strength required for the receiver to indicate that no object is present, based on a determined range or distance between the emitter and the receiver. For example, the system may increase the threshold of the receiver as the strength of the received signal from the emitter increases, and upon certain conditions, decrease the threshold of the receiver as the strength of the received signal decreases. For example, the obstacle detection system may utilize two, three, or more different receiver thresholds corresponding with different distance ranges between the emitter and receiver. The multi-stage range determining operation adjusts the receiver's threshold automatically when the emitter and receiver are installed at moderate to short distances from one another. By increasing the threshold of the receiver, this system will disregard low-level reflected light, thus avoiding the problem of ignoring legitimate obstructions, while allowing the system to operate reliably over a wide physical range between the emitter and receiver. The object detection system also limits when the threshold of the receiver may be decreased to one or more predetermined conditions, which increases at least one of the safety and the accuracy of the present object detection system.

Sensitivity can be controlled in a number of different ways. In the present system and method the sensitivity is adjusted by controlling the signal threshold without modifying the gain of the system. This threshold control or adjustment allows the reception of a set amount of signal to be ignored. Furthermore, the present system and method may optionally employ controlling the gain at either or both the emitter and detector side.

In one embodiment, the object detection system does not automatically adapt to low-level reflections and cause the receiver to adjust the threshold of the receiver, which would raise the likelihood of the system ignoring a legitimate obstruction due to detecting reflected light. In some applications, it is preferable for the receiver to raise a threshold for received signal during operation, and to avoid lowering the threshold, thereby increasing the sensitivity of the receiver. Therefore, the system allows the receiver to decrease a threshold only under predetermined conditions, such as during installation of the object detection system. The system includes or may be configured with an installation or install mode, in which the received signal threshold of the receiver may be increased or decreased, which is activated for a predetermined period of time after the first power-up of the object detection system. After the expiration of the install mode, the system will operate continuously in an operation mode such as a run mode, in which the threshold of the receiver may only be increased. In addition, the object detection system may be returned to install mode upon intervention by a user. For example, the object detection system may be reset and caused to return to install mode when the receiver detects a predetermined number of obstructions in a relatively short time period.

With reference to FIG. 1, a movable barrier operator system 100 is provided that includes a movable barrier operator 101 positioned within a garage 102. The movable barrier operator 101 mounts to a ceiling 103 of the garage 102 and serves to control the position of a movable barrier, such as a multi-panel garage door 104. The multi-panel garage door 104 includes a plurality of rollers rotatably confined within a pair of tracks 105 positioned on opposite sides of an opening 106 of the garage 102.

The movable barrier operator 101 includes a head unit having a motive component such as an electric motor and a rail assembly 107. The rail assembly 107 in this example includes a trolley 108 operatively connected to the motor of the head unit and having an arm 109. The arm 109 connects to an upper portion 110 of the garage door 104. The trolley 108 is connected to the motor of the head unit by a coupling, for example, an endless chain, belt, or screw drive, all of which are well known in the industry. The head unit changes the position of the garage door 104 by moving the trolley 108 along the rail of the rail assembly 107.

The head unit includes communication circuitry having an antenna 111 to facilitate receiving transmissions from one or more remote platforms such as transmitter 112. Transmitter 112 may be a portable transmitter (such as a keyfob-style or visor-mounted transmitter), a keypad transmitter, a computing device (such as a personal computer or a portable computer), a smartphone, a tablet computer, or other user device capable of transmitting commands to the movable barrier operator 101. The communication circuitry typically connects to a processor of the movable barrier operator 101 that interprets received signals and responsively controls other portions of the movable barrier operator 101.

The communication circuitry also includes a transmitter having an antenna 114 to facilitate communications with one or more remote computing devices, such as a server computer or a user's smartphone. In many application settings, the antennae 111, 114 will operate using non-overlapping and considerably different frequency bands.

A user interface 113, such as a push button-based wall control unit, may communicate via wired or wireless signals with the movable barrier operator 101 to affect control of the movable barrier operator motor and other components. So configured, for example, a user can operate the user interface 113 to signal to the movable barrier operator 101 that the barrier 104 should now be moved from an open position to a closed position.

The movable barrier operator system 100 includes an object detection system 115 in communication with the movable barrier operator 101. Communication between the object detection system 115 and the movable barrier operator 101 may be via wired transmission, as shown in the illustrative example of FIG. 1 or, alternatively, may be via wireless transmission.

The object detection system 115 includes a first component, such as emitter 116, in communication with a second component, such as receiver 117, such that the object detection system 115 detects when an obstacle is in the opening 106 obstructing the path of the garage door 104. The object detection system 115 may also include a third component 118 that houses, for example, circuitry for operating the object detection system 115 and/or for communicating with other components in the movable barrier operator system 100. Upon detecting an obstacle, the object detection system 115 signals the movable barrier operator 101, which can then, for example, cause a reversal or opening of the door 104 to avoid contact with the obstacle.

The various components 116, 117, 118 of the object detection system 115 may be coupled to a variety of surfaces in a variety of environments. For example, the components 116, 117, 118 may be mounted to a ground surface, wall surfaces adjacent to the opening 106, and/or a portion of the movable barrier operator system 100 (such as, for example, the guide tracks 105). Other examples are possible. Accordingly, the object detection system 115 may be easily retroactively installed to work in conjunction with various existing movable barrier operator systems 100.

Figure 2:
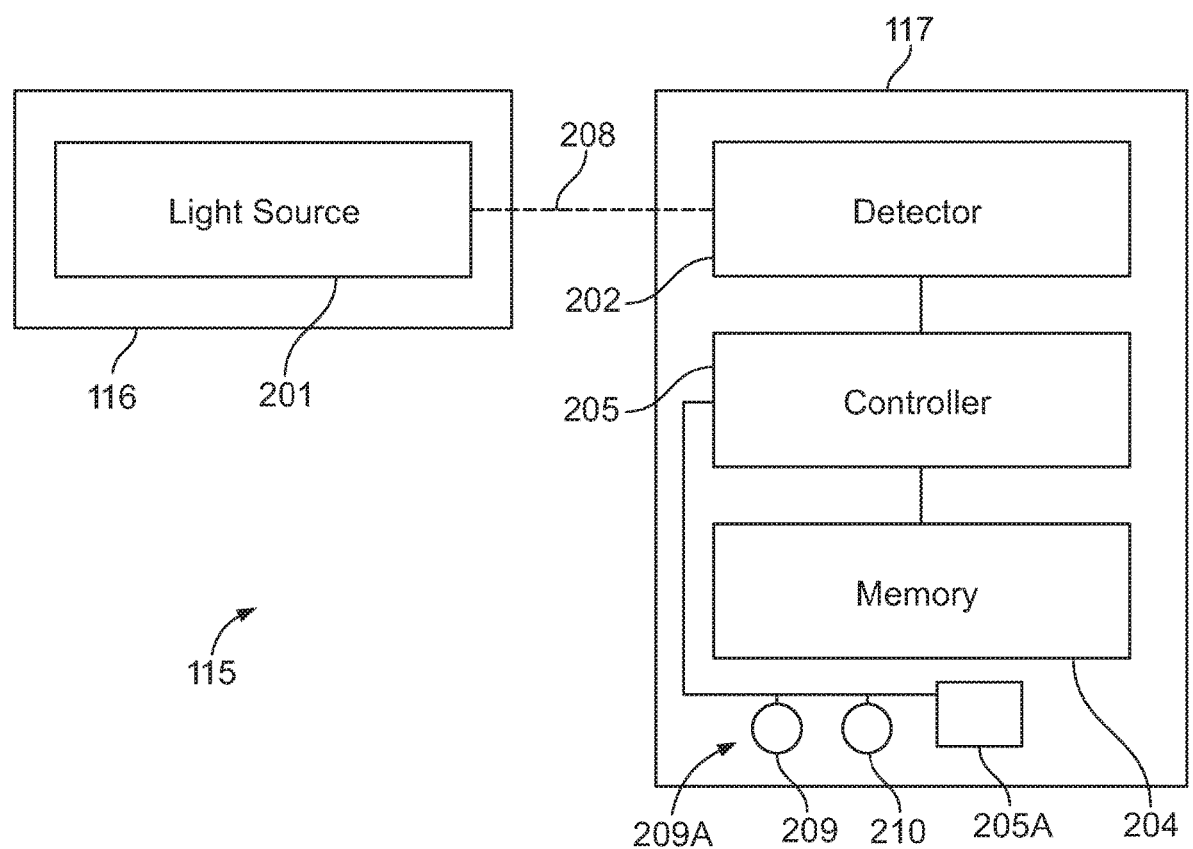
FIG. 2 is a block diagram of the object detection system of FIG. 1.

Referring now to FIG. 2, in one embodiment, the object detection system 115 takes the form of a thru-beam type system which includes the emitter 116 with photoelectric source 201 configured to emit a light signal 208, such as an infrared (IR) signal constituted by pulses, and the receiver 117 includes a detector 202 configured to receive at least a portion of the light signal 208. The receiver 117 also includes a memory 204 configured to store at least one of data and instructions (e.g. routines) used to adjust the received signal threshold of the receiver 117 and the parameters associated therewith, and a controller 205 configured to, inter alia, adjust the receiver threshold relative to the data and instructions in memory 204, compare attributes of a received light signal 208 to information stored in the memory, and output whether an obstacle is detected to the movable barrier operator 101. The controller 205 includes a processor and circuitry operatively coupled to the detector 202 and the memory 204 such that the controller 205 receives information from the light source 201, the detector 202, and the memory 204 directly or indirectly. The controller 205 may be operatively connected to the light source 201, the detector 202, and/or the memory 204 via wired or wireless communication mediums. This flexibility allows the arrangement of the controller 205 to be adapted to the operational needs and/or the application or context of the object detection system 115. The receiver 117 also includes a user interface 209A, such as a visual indicator including one or more lights (e.g. a color-changing light emitting diode (LED) or multiple LEDs such as red and blue LEDs 209, 210), for providing information to the user regarding the status of the object detection system 115 and or the receiver 117. The information provided by the user interface 209A of the receiver 117 may include the current status or mode, received signal strength, the presence or absence of an obstacle, and various fault conditions. The emitter 116 may also be provided with a user interface, such as one or more LEDs, for providing information to the user regarding the object detection system 115 and/or the emitter 116.

The arrangement of the light source 201 and the detector 202 can be adapted to the operational needs and/or the anticipated application or context of the object detection system 115. In one example configuration, the object detection system 115 employs a thru-beam approach where the emitter 116 and the receiver 117 are positioned on opposing sides of the opening 106 of the garage 102. The emitter 116 emits a signal that is received at the opposite side of the opening 106 by the receiver 117. In another example configuration, the object detection system 115 employs a retro-reflective approach in which the emitter 116 and receiver 117 are positioned on a same side of the opening 106, and a reflector (not shown) is positioned on the opposite side of the opening 106. The reflector (which may be a mirror, a reflector, a retroreflector, or a retransmission device) reflects the signal emitted from the emitter 116 back to the receiver 117. In this configuration, the first component of the object detector system 115 includes the emitter 116 and the receiver 117, and the second component includes the reflector. This configuration may reduce the wiring in the garage 102, as only the first component 116 needs to be wired for power and information transfer.

Regarding FIG. 2, the receiver 117 is configured to adjust signal reception by the receiver 117 using a multistep threshold-setting operation as described further below with reference to FIGS. 3-8. In one form, the object detection system 115 includes two principle modes of operation, install mode and operation or run mode, each of which may include additional routines, as described further below. The install mode allows the object detection system 115 to both increase and decrease the threshold of the receiver 117, while the run mode only allows the receiver 117 to increase the threshold of the receiver 117. In the install mode, the threshold of the receiver 117 may be increased or decreased to account for installation site specific conditions, such as the distance between the emitter 116 and receiver 117, which affects the strength of the signal received by the receiver 117. If the received signal is relatively high in intensity, the object detector system 115 will increase the threshold of the receiver 117. If the received signal has relatively low intensity, the object detector system 115 will decrease the threshold of the receiver 117. Because too low of a threshold of the receiver 117 for a given distance may cause the object detector system 115 to ignore an obstruction in some instances, it can be undesirable to allow the object detector system 115 to decrease the threshold at any time. Thus, the install mode may be limited in duration so that the object detection system does not lower the receiver threshold at any time or continually adjust its threshold.

In one form, the receiver 117 may be provided with three different range settings, such as a long-range setting 905 (see FIG. 9), a mid-range setting 904, and a short-range setting 903. The range settings are preferably determined by comparing the signal strength detected by the receiver to at least two different signal strength thresholds. For example, if the range setting is set to the long-range setting 905, but the signal strength is higher than a threshold for a long to mid-range application, the range setting will be decreased to a mid-range setting. This will occur, for example, when the receiver 117 is set for a long-range application but the emitter 116 and receiver 117 are configured or installed closer together, such as a mid-range application. Similarly, if the range setting is set to a mid-range setting, but the signal strength is higher than a predetermined threshold for a mid- to short-range application, the sensitivity of the receiver 117 will be decreased to a short-range setting. If the receiver threshold is set to a short-range setting, it will remain at this setting unless the system is returned to an install mode where the threshold can be lowered under certain conditions.

In one form, the install mode is active for a predetermined length of time, such as the first thirty minutes of powered up time, or during a predetermined number of power cycles, such as during the first five times that the object detection system 115 is powered up. After the predetermined length of time expires or the sixth power-up occurs, the receiver 117 enters the run mode and utilizes the range or threshold setting determined during the install mode. In the install mode, the receiver 117 may require user intervention to lower the threshold of the receiver 117, such as by blocking and clearing the light signal 208 a predetermined number of times not typically occurring (e.g. due to legs of a human or animal blocking the light signal 208), such as three times. In one embodiment, the object detection system 115 powers up with the receiver at its threshold correlating to the long-range setting 905.

Once the install period expires, the receiver 117 is prohibited from adjusting its threshold downward, e.g. change from the short-range setting 903 to the mid-range setting 904 and/or change from the mid-range setting 904 to the long-range setting 905. The receiver 117 may, however, raise the threshold, e.g. change from the long-range setting 905 to the mid-range setting 904 or change from the mid-range setting 904 to the short-range setting 903. By allowing the receiver 117 to adjust its threshold in real time, the installer has unlimited time to align the emitter and receiver, even if the emitter and the receiver were out of alignment during the entire install time period. Once the emitter 116 and receiver 117 are aligned, the receiver 117 may automatically detect the peak received signal and the receiver 117 will increase its threshold based on the peak signal measurement during alignment, ensuring the receiver 117 is not overly sensitive to light reflected from the surrounding environment.

In one embodiment, the object detection system 115 is adjusted by changing the signal threshold at which the receiver will indicate that an object is present. In particular, when no signal is received (i.e. a signal strength of zero or substantially zero), the receiver 117 communicates with the moveable barrier operator 101 to indicate that an object is present. The communication may involve a communication interface 205A (FIG. 2) of the receiver 117 sending a signal, or stopping sending a signal, to the movable barrier operator 101. The communication interface 205A may communicate with the movable barrier operator 101 via wired approaches and/or wireless approaches, such as via WiFi or Bluetooth® communication protocols.

When a strong signal is received, the receiver 117 communicates with the moveable barrier operator 101 to indicate that no object is present. As the signal strength increases from zero, there is a threshold at which the receiver 117 will change its output from indicating that an object is present to indicating that no object is present, i.e., there is no object blocking the light emitted by the light source 201. Upon the threshold of the receiver 117 being decreased, the signal strength needed to indicate that no object is present is lower. Stated differently, a relatively weaker signal received by the receiver 117 will be interpreted as there being no object present. When the threshold of the receiver 117 is increased, it takes a relatively stronger signal for the receiver 117 to indicate that an object is not present. Thus, when an object interrupts the light signal 208, but the light signal 208 is reflected by a nearby object (e.g. a garage floor) and the weaker, reflected light signal 208 is received by the detector 202, the receiver 117 will be less likely to indicate incorrectly that an object is not present when the threshold is lower. In other words, if the threshold is low, the receiver 117 will indicate an object is present for a smaller range of received signal strengths, from no signal to the threshold level. Conversely, if the threshold is high, the receiver will indicate an object is present for a larger range of received signal strengths, also starting from zero to the higher threshold level. Thus, increasing or decreasing the threshold of the receiver 117 as described herein may not involve increasing or decreasing the gain of light source 201 or the detector 202. However, in alternative forms, instead of changing the signal strength threshold at which the receiver 117 outputs a signal indicating that no object is present, the gain of the object detection system 115 could be modified, such as by increasing or decreasing the strength of the light signal 208 emitted by the light source 201 or by increasing or decreasing the gain of the detector 202, such as through an automatic gain compensation (AGC) algorithm.

Figure 3:
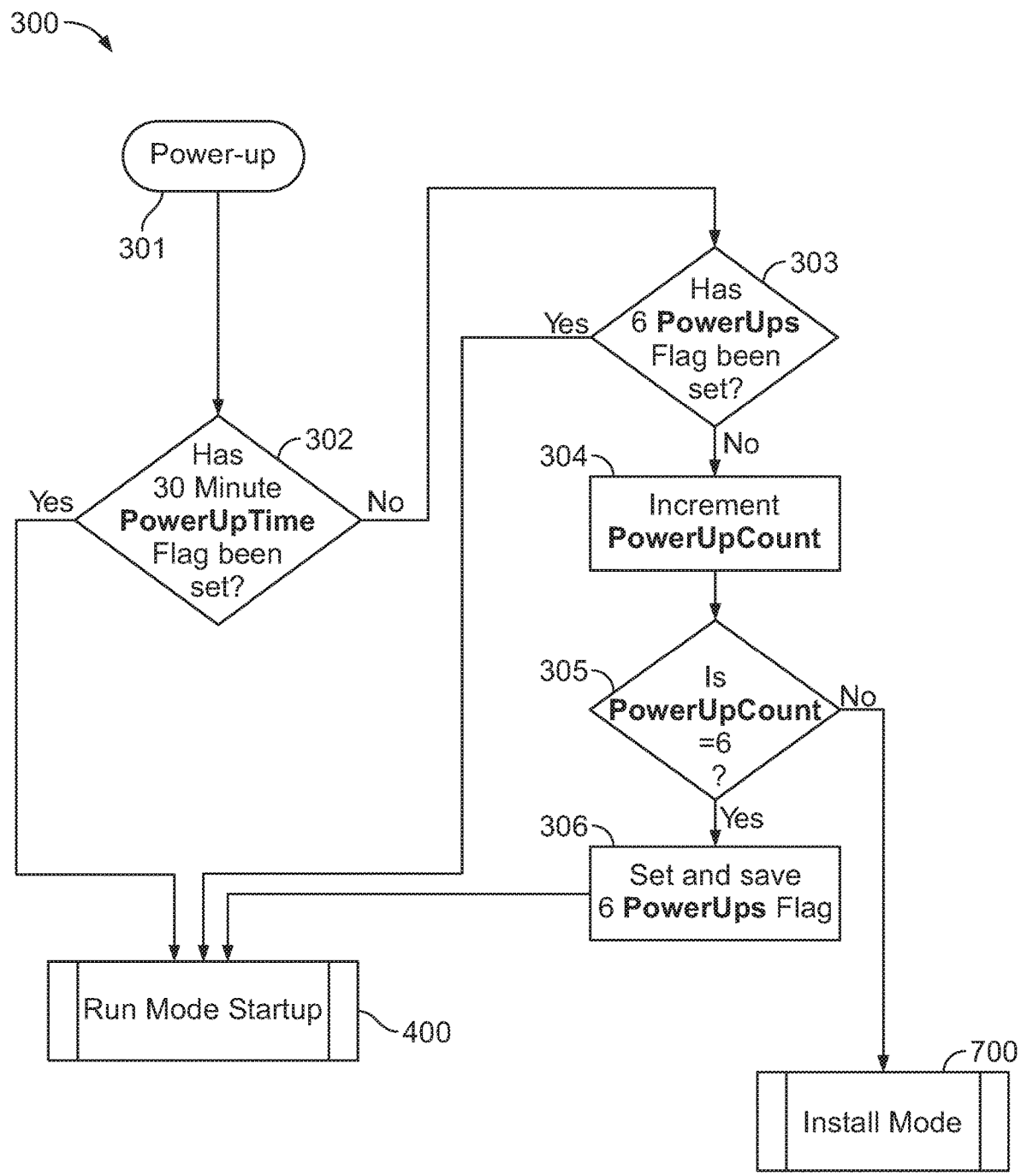
FIG. 3 is a flow diagram of an example power-up sequence for a method of automatically adjusting the operation of the object detection system of FIG. 1.
Figure 4:
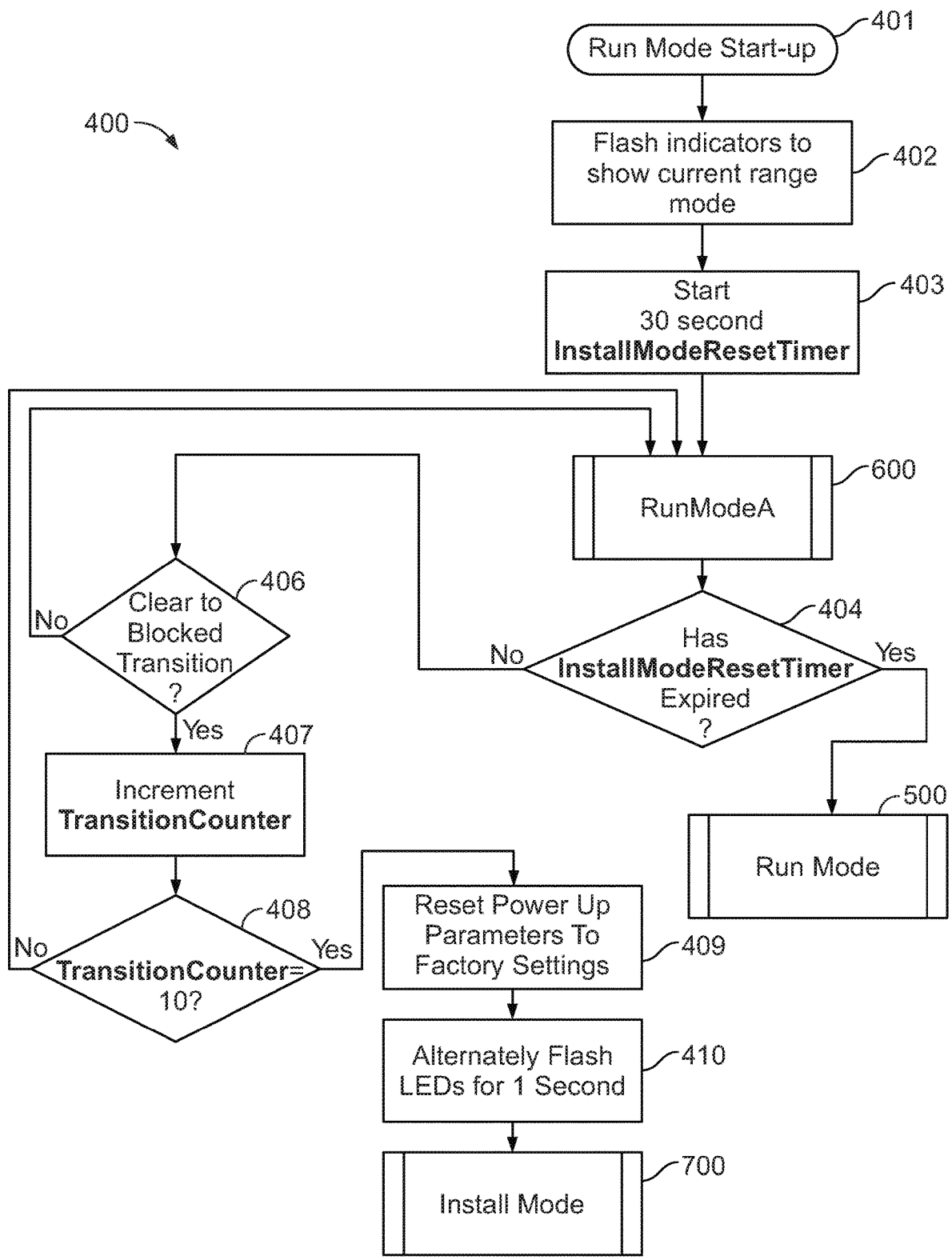
FIG. 4 is a flow diagram of an example run mode start-up sequence for the method of automatically adjusting the operation of the object detection system.

Regarding FIG. 3, an example start-up process 300 is provided that is executed by the controller 205 when the object detection system 115 is powered up. Immediately after power up 301, in step 302, the controller 205 checks the memory 204 to determine whether the parameter PowerUpTime flag has been set, indicating that the time period for the install mode has been completed after power up of the object detection system 115. The PowerUpTime flag is set (see step 704 of FIG. 7) after a predetermined period of time has elapsed, such as thirty minutes of continuously powered up time. However, other time periods sufficient for a user to install the object detection system 115 may be employed, such as forty-five or sixty minutes. If the PowerUpTime flag has been set, indicating that the install time period has elapsed, then the controller 205 begins the Run Mode Startup routine 400, which is shown in FIG. 4 and described below. Thus, after elapse of the install time period, the system 115 will exit the install mode, which will be further described with reference to FIGS. 7 and 8. Alternatively, or in addition, the install mode may be exited after a predetermined number of power cycles of the object detection system 115, such as five power cycles, i.e., after the system has been powered up six times. This feature is particularly useful for object detection systems 115 that are connected to certain movable barrier operators, which may turn off power to the object detection system 115 when the movable barrier 104 is closed. In particular, without a power cycle counter exit, an object detection system connected to a battery-powered movable barrier operator may not leave install mode because the system would not be powered up for long enough for the install time period to expire.

Figure 7:
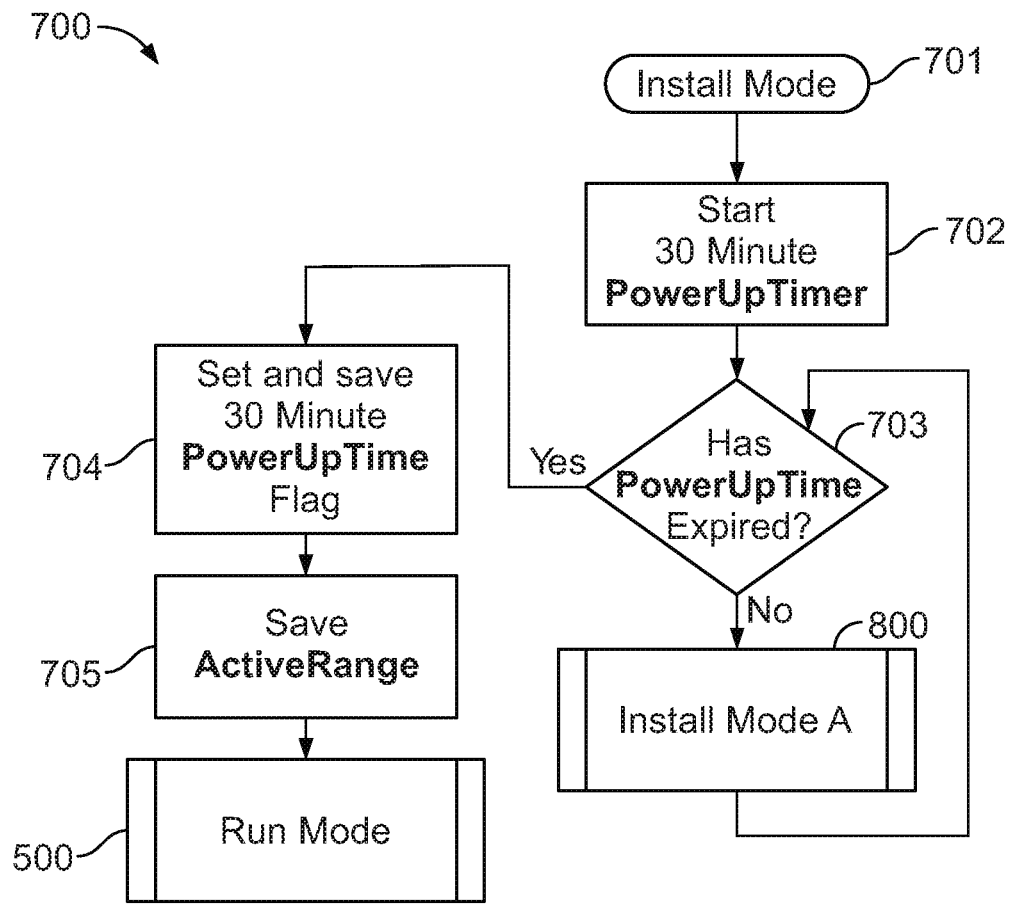
FIG. 7 is a flow diagram of an example install mode sequence for the method of automatically adjusting the operation of the object detection system.

The install mode time period is tracked by a timer, indicated by the routine PowerUpTimer shown in step 702 of FIG. 7, which is executed upon the start of install mode. Referring again to FIG. 3, if in step 302 the PowerUpTime flag has not yet been set, meaning that the install mode time period has not yet elapsed, the controller 205 then checks in step 303 whether the system 115 has been powered up a predetermined number (e.g. six) times by checking the flag 6 PowerUps. As shown in step 304, the controller 205 increments the parameter PowerUpCount if the flag 6 PowerUps has not yet been set. The controller then checks the value of PowerUpCount in step 305. If PowerUpCount is equal to six, indicating that the system has gone through six power cycles during the install time period, the controller 205 sets and saves the 6 PowerUps flag in step 306 and then begins the Run Mode Startup 400. In step 305, if PowerUpCount is not equal to six, indicating that there have not yet been six power cycles during the install period, then the controller 205 begins install mode 700, shown in FIG. 7.

Figure 8:
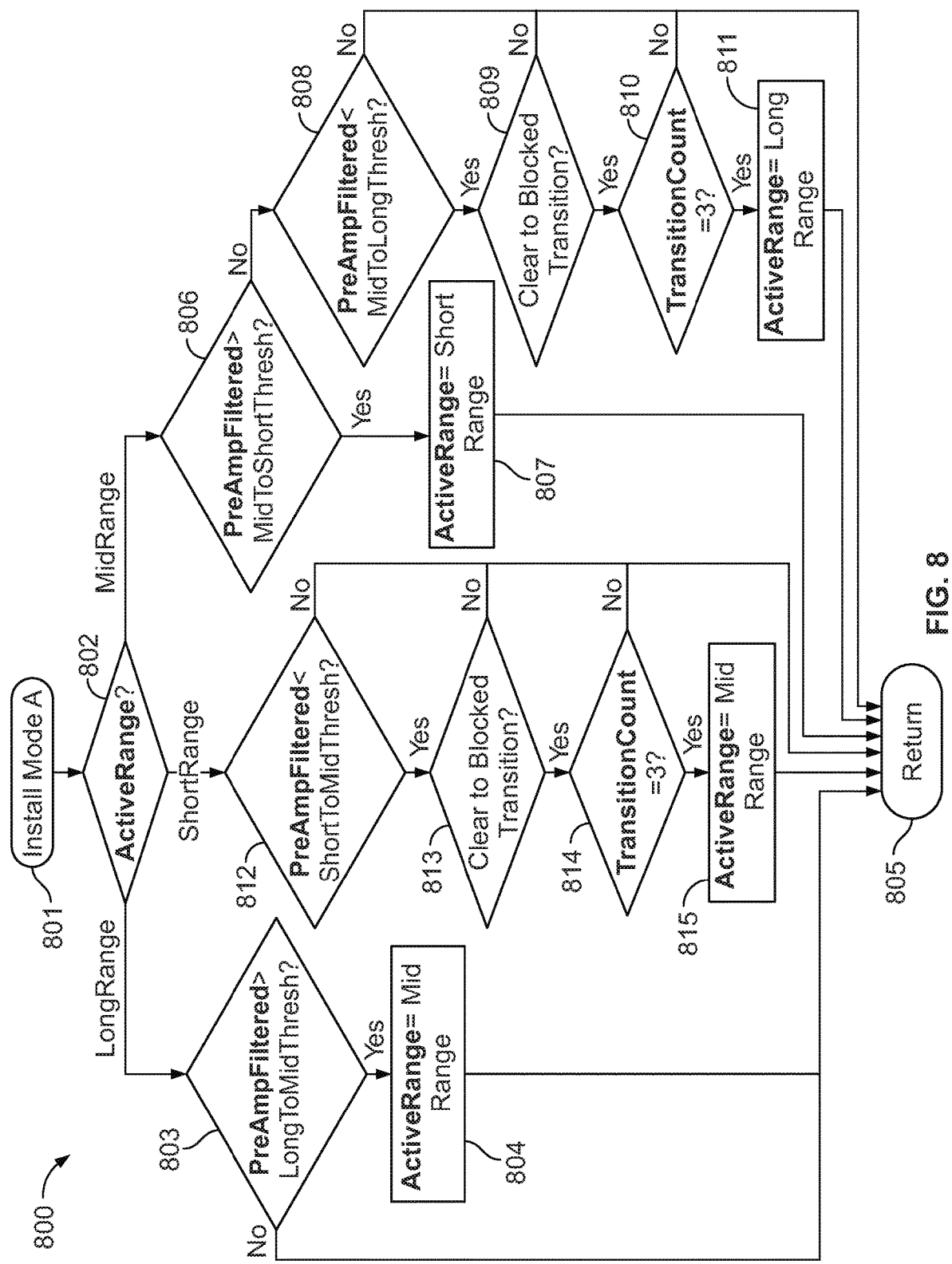
FIG. 8 is a flow diagram of an example install mode range setting method for the method of adjusting the operation of the object detection system.

With reference to FIG. 7, install mode 700 begins at step 701. In step 702, the install time period is started by starting the timer PowerUpTimer, which continues for the desired install time period, such as thirty minutes. In step 703, the controller 205 checks whether the PowerUpTimer has expired. If it has not, the controller 205 continues to the range setting routine of Install Mode A 800, which is shown in FIG. 8. The controller 205 executes the Install Mode A routine until the PowerUpTimer expires.

Referring to FIG. 8, the Install Mode A routine starts at step 801. In step 802, the controller 205 checks the setting of the current range or threshold parameter, ActiveRange. The ActiveRange parameter may be set to a long-range setting, LongRange, as a default, which corresponds to a low threshold setting of the receiver 117. If the ActiveRange parameter is set to the LongRange setting, the controller 205 executes step 803 and checks the signal strength detected by the receiver 117, represented by the parameter PreAmpFiltered. In one embodiment, the signal strength is measured by units of Excess Signal Factor ("E.S.F."). Excess Signal Factor correlates directly to the strength of the signal detected by the receiver and represents the amount of signal strength above and beyond what is needed for the receiver to accurately detect an object. For example, a value of three E.S.F. represents a signal strength that is three times the signal strength needed for the obstacle detection system to function properly. If the signal strength is greater than a first threshold value, for example 25 E.S.F., represented by the parameter LongToMidThresh, then the controller 205 will set the ActiveRange parameter to a middle-range setting, MidRange, as shown in step 804. This middle-range setting causes the receiver 117 to operate at an appropriate threshold level for mid-range applications, the sensitivity being lower than when the ActiveRange parameter is set to LongRange. If the signal strength detected by the receiver 117 is not greater than the LongToMidThresh parameter, for example, 25 E.S.F., the ActiveRange parameter is not changed and remains set to LongRange, i.e., the threshold of the receiver 117 is not changed. In either case, the controller 205 continues to the return step 805, bringing the routine back to step 703 in FIG. 7, and checks whether the PowerUpTimer has expired. If the install time period has not yet expired, the controller 205 repeatedly executes the Install Mode A routine 800.

Returning to FIG. 8, the controller 205 again checks the ActiveRange setting in step 802. If the ActiveRange parameter is set to MidRange, in step 806 the controller 205 checks whether the signal strength (represented by parameter PreAmpFiltered) detected by the receiver 117 is greater than a second threshold value, for example 192 E.S.F., represented by the parameter MidToShortThresh. If the signal strength is sufficiently high, i.e., greater than 192 E.S.F., in step 807 the controller will set the ActiveRange parameter to a short-range setting, ShortRange, thereby decreasing the receiver's sensitivity. The controller 205 then returns via step 805 to step 703 in FIG. 7. Alternatively, in step 806, if the signal strength detected by the receiver 117 is less than the second threshold value, MidToShortThresh, the controller 205 proceeds to step 808, wherein the controller will determine whether to adjust the threshold of the receiver 117 in steps 808-810.

First, in step 808, the controller 205 checks whether the signal strength (represented by parameter PreAmpFiltered) detected by the receiver 117 is less than a third threshold value, for example 21 E.S.F., represented by the parameter MidToLongThresh. This parameter is different than the threshold value LongToMidThresh in step 803 due to hysteresis, but in some cases could be the same as LongToMidThresh. If the signal strength detected is greater than the threshold value, MidToLongThresh, then the system has sufficient signal strength and the controller 205 will return to step 703 without changing the threshold or sensitivity setting. However, if the detected signal strength is lower that the threshold value MidToLongThresh, the controller continues to step 809. The receiver 117 may decrease its threshold only after the light signal 208 emitted by the emitter 116 transitions from detecting no obstruction to detecting an obstruction a predetermined number of times, such as three times. This prevents the receiver 117 from instantaneously and/or continuously decreasing its threshold due to detecting low-level reflected light in moderate or short-range installations. Accordingly, in step 809, the controller 205 checks whether receiver 117 has detected an obstruction. If not, the controller 205 returns to step 703 in FIG. 7 to check whether the install time period has expired. If the receiver 117 has detected a clear to blocked transition in step 809, the controller 205 checks in step 810 whether there have been three clear-to-blocked transitions detected by the receiver 117 by checking whether the parameter TransitionCount is equal to three. If the parameter TransitionCount is not equal to three, the controller 205 returns to step 703 in FIG. 7. If TransitionCount is equal to three, the controller sets the ActiveRange parameter to LongRange in step 811, thereby increasing the receiver's sensitivity. The controller 205 then returns via step 805 to step 703 in FIG. 7.

If during install mode the ActiveRange is set to the short-range setting ShortRange, the controller will proceed from step 802 to one or more of steps 812-815 to determine whether the threshold should be decreased following a similar process to steps 808-811 described above. In step 812, the signal strength detected (represented by parameter PreAmpFiltered) is compared to a fourth threshold value for lowering the threshold of the receiver to the middle-range setting MidRange, for example 171 E.S.F., represented by the parameter ShortToMidThresh. If the detected signal strength is less than the fourth threshold value, then the controller proceeds to step 813. If the detected signal strength is greater than the fourth threshold value, the controller will return to step 805 and then step 703. Preferably, the receiver 117 will lower the threshold only after the receiver 117 transitions from detecting no obstruction to detecting an obstruction a predetermined number of times, such as three times. As discussed above, this feature prevents the receiver 117 from instantaneously lowering the threshold due to detecting low-level reflected light in moderate or short-range installations. Accordingly, in step 813, the controller checks whether receiver 117 has detected an obstruction. If not, the controller 205 returns via step 805 to step 703 in FIG. 7 to check whether the install time period has expired. If the receiver 117 has detected an obstruction in step 813, the controller 205 then checks in step 814 whether there have been three transitions detected by the receiver 117 by checking whether the parameter TransitionCount is equal to three. If the parameter TransitionCount is not equal to three, the controller 205 returns via step 805 to step 703 in FIG. 7. If TransitionCount is equal to three, the controller 205 in step 815 sets the ActiveRange parameter to MidRange, thereby lowering the threshold of the receiver 117. The controller 205 then returns via step 805 to step 703 in FIG. 7.

Now referring back to step 704 in FIG. 7, if the install time period timer PowerUpTimer has expired, such as after a predetermined duration such as thirty or sixty minutes, the controller 205 sets and saves the PowerUpTime flag in memory 204. In step 705, the controller 205 then saves the current ActiveRange setting to memory 204. Thus, if the object detection system 115 loses power after install mode is completed, the object detection system 115 will power up in the same sensitivity, threshold, or range setting as determined during the install mode. The object detection system 115 will not go back into install mode, as shown in step 302 of FIG. 3, until the appropriate conditions are met, such as by following the install mode reset routine of FIG. 4, which will be described further below. Otherwise, after the current range ActiveRange is saved in memory at step 705, the controller 205 then begins run mode 500, shown in FIG. 5.

Thus, after the expiration of the install time period, or after a sufficient number of power cycles, the object detection system 115 begins the run mode. The system remains in the run mode until the object detection system 115 is manually switched to install mode, such as by using the install mode reset method shown and described in FIG. 4. In run mode, the threshold of the receiver 117 may be raised, but it may not be lowered, which may only be done in install mode. In one embodiment, the controller 205 continually, periodically or is otherwise triggered to check whether the receiver threshold is set at the appropriate level. This is useful in situations where the emitter 116 and receivers 117 were installed without being properly aligned, causing the receiver 117 to only receive a partial strength light signal 208 from the emitter 116. If the emitter 116 and receiver 117 are later brought into alignment, the threshold of the receiver 117 may be too low if the emitter and receiver are installed in a mid- or short-range application. Thus, the run mode may continually check the threshold or sensitivity level and adjust the operation of the receiver 117 when appropriate.

In some instances, the threshold of the object detection system 115 may need to be lowered after the install mode has ended. For example, the receiver 117 may have been set at a short-range setting, such that the sensitivity or threshold of the receiver 117 remains set at a short-range setting after the expiration of install mode. If the emitter 116 and receiver 117 are then installed in a moderate to long-range application, it is necessary to return to install mode from run mode in order to lower the threshold setting of the receiver 117. In one form, a user may reconfigure the object detection system 115 from run mode to install mode by turning the power to the system off for five seconds, turning the power back on, and then obstructing and clearing the beam ten times within the first thirty seconds after power was reapplied. The receiver 117 may provide a visual indication that install the mode is active, such as by causing one or more LED lights 209, 210 to blink or change color.

Returning to FIG. 3, if the object detection system 115 is powered up after PowerUpTime flag has been set after the expiration of the PowerUpTimer, as shown in step 302, the controller 205 will execute the Run Mode Startup routine 400. Turning to FIG. 4, the Run Mode Startup routine 400 begins in step 401. In step 402, the receiver 117 provides an indication of the current range setting, i.e. short, medium or long, by flashing the LED indicators 209, 210. For example, the LED indicators 209, 210 are caused to flash once for short-range, two times for mid-range, and three times for long-range. Next, in step 403, the controller 205 starts an install mode reset timer, InstallModeResetTimer, which in the preferred form is set for thirty seconds. The controller 205 then begins the run mode range setting routine, RunModeA 600, which is shown in detail in FIG. 6. In this routine, the receiver 117 may raise its threshold, but the receiver module 117 may not lower its threshold.

The RunModeA routine starts at step 601. The controller 205 then checks the current range setting, ActiveRange, in step 602, which is similar to step 802 of the Install Mode A routine 800 of FIG. 8. If the ActiveRange parameter is set to a long-range setting LongRange, the controller 205 executes step 603 and checks the signal strength detected by the receiver 117, represented by the parameter PreAmpFiltered. If the signal strength is greater than a first threshold value, for example 25 E.S.F., represented by the parameter LongToMidThresh, then the controller 205 will set the ActiveRange parameter to a middle-range setting, MidRange, as shown in step 604. This causes the threshold of the receiver 117 to be higher than when the ActiveRange parameter is set to LongRange. The controller 205 then saves the ActiveRange parameter to memory 204 in step 605. If the signal strength detected by the receiver 117 is not greater than the LongToMidThresh parameter, for example, 25 E.S.F., the ActiveRange parameter is not changed and remains set to LongRange, i.e., the sensitivity or threshold of the receiver 117 is not changed. In either case, the controller 205 continues to the return step 608, bringing the routine back to step 404 in FIG. 4, and the controller 205 checks whether the InstallModeResetTimer has expired. If the thirty second InstallModeResetTimer has not yet expired, the controller checks to see whether there have been ten clear to blocked transitions detected by the receiver 117 in steps 406-408. If no clear to blocked transitions have occurred in step 406, the controller returns to the run mode range setting routine RunModeA 600.

Returning to FIG. 6, the controller 205 again checks the ActiveRange setting in step 602. If the ActiveRange parameter is set to MidRange, in step 606 the controller checks whether the signal strength (represented by parameter PreAmpFiltered) detected by the receiver 117 is greater than a second threshold value, for example 192 E.S.F., represented by the parameter MidToShortThresh. If the signal strength is sufficiently high, i.e., greater than 192 E.S.F., in step 607 the controller 205 will set the ActiveRange parameter to a short-range setting, ShortRange, thereby raising the threshold, effectively decreasing the receiver's sensitivity. In step 605, the controller 205 saves the ActiveRange parameter to memory. The controller 205 then returns via step 608 to step 404 in FIG. 4 and checks whether the install mode reset timer has expired. Alternatively, in step 606, if the signal strength detected by the receiver 117 is less than the second threshold value, MidToShortThresh, the controller 205 proceeds to step 608 and returns to step 404. Finally, if the ActiveRange parameter is set to ShortRange at the beginning of the RunModeA routine 600, the controller proceeds to step 608 and returns to step 404 in FIG. 4. Thus, if the object detection system is set to the ShortRange setting before or during the run mode, it will remain in the ShortRange setting unless the object detection system 115 is reset to install mode.

Returning to install mode is achieved by the following steps. Returning to FIG. 4, if during the thirty second reset time period tracked by InstallModeResetTimer, the receiver 117 detects ten clear-to-blocked transitions, which are incremented and stored in the parameter TransitionCounter in step 407, the controller 205 will proceed after step 408 to step 409 and reset the power up parameters shown in FIG. 3, e.g., PowerUpTime, the PowerUp flag, and PowerUpCount, to the default settings. The controller 205 will then notify the user that the power up parameters have been reset and the receiver 117 is returning to install mode by alternatingly flashing the LEDs 209, 210 for one second in step 410, and then return to install mode 700, shown in FIG. 7. If the install mode reset timer has expired without ten clear to blocked transitions, the controller starts run mode 500 in step 404.

Figure 5:
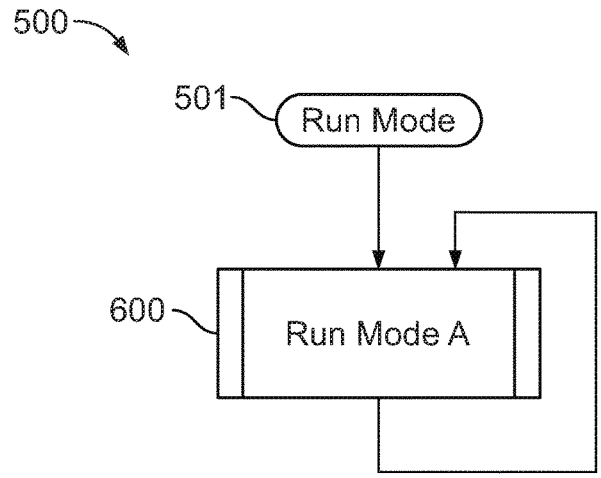
FIG. 5 is a flow diagram of an example run mode sequence for the method of automatically adjusting the operation of the object detection system.
Figure 6:
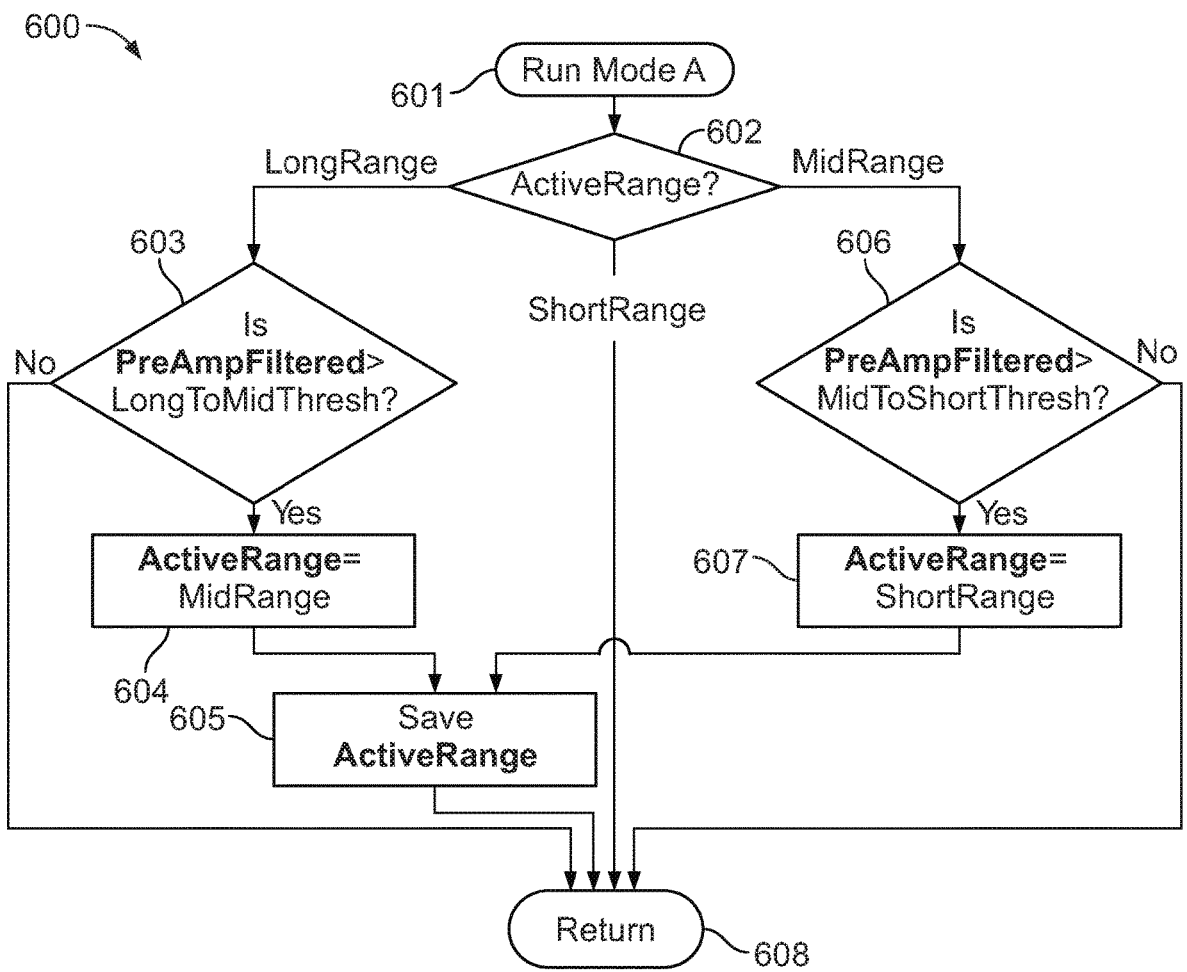
FIG. 6 is a flow diagram of an example run mode range setting method for the method of automatically adjusting the operation of the object detection system.

Referring now to FIG. 5, run mode begins at step 501 and proceeds to the run mode range setting routine RunModeA 600, which is executed in a loop indefinitely, until the object detection system 115 experiences a power cycle or other input or interruption to, for example, enter install mode or the like. The system 115 may experience a power cycle when the system 115 is disconnected from mains electricity and then subsequently reconnected to the mains electricity. In the instance of a power cycle, the controller 205 begins the start-up process or routine 300 shown in FIG. 3.

Figure 9:
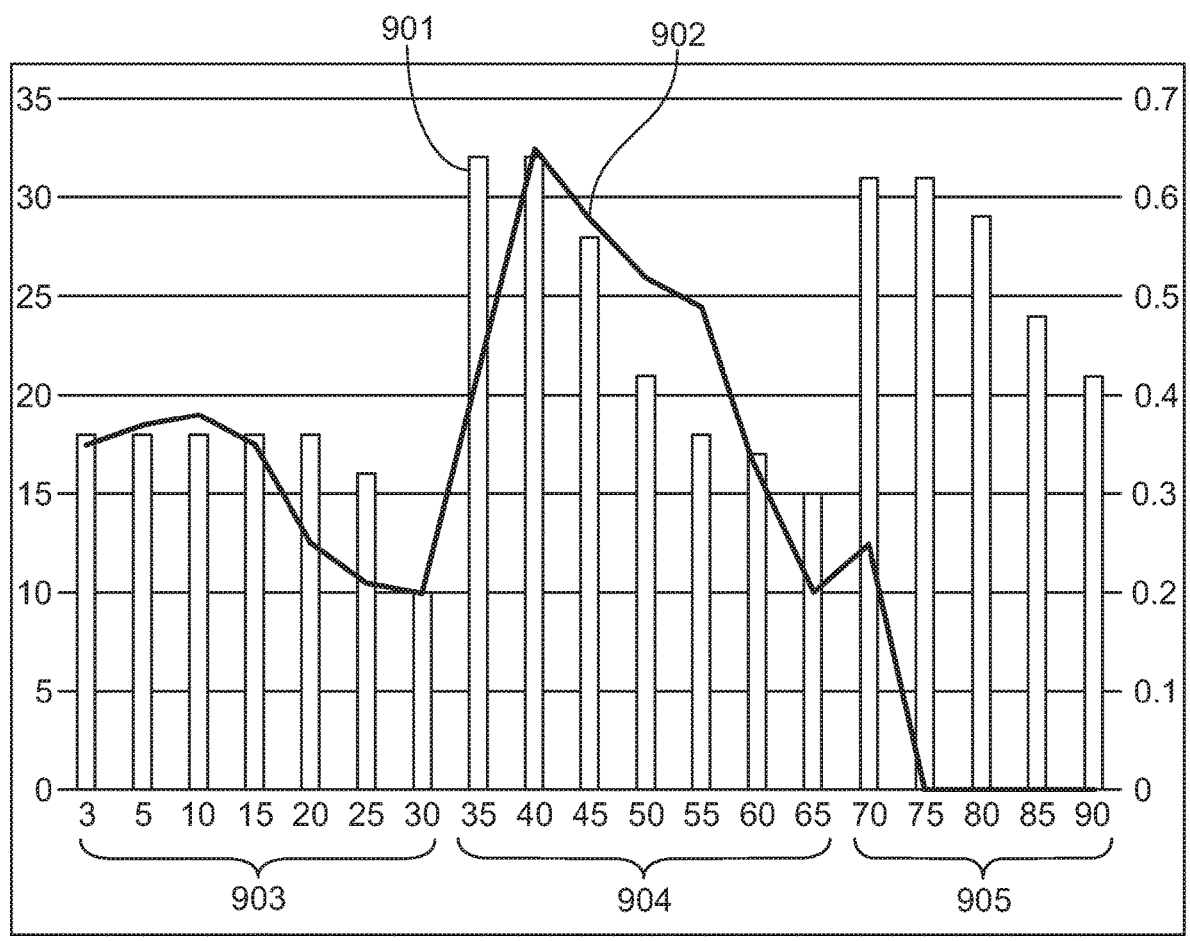
FIG. 9 is a chart illustrating the detected Effective Excess Signal Factor and Reflection Threshold Factor at various distances for an example object detection system having the emitter and receiver thereof at various distances and various range or operational settings of the object detection system.

Referring now to FIG. 9, a chart illustrating test results of an embodiment of the object detection system 115 is reproduced. To test the object detection system 115, the emitter 116 and receiver 117 were placed in run mode and the emitter 116 and receiver 117 were installed at varying distances apart from one another, starting at 90 feet apart and decreasing to 3 feet at regular intervals. The Effective Excess Signal Factor 901 and Reflection Threshold Factor ("R.T.F.") 902 were measured at each distance. Effective Excess Signal Factor 901 is the Excess Signal Factor measured by the receiver after compensation, if any, by adjustment of the receiver threshold, which effectively reduces the sensitivity of the receiver. The Effective Excess Signal Factor 901 measured at each distance is represented by the black bars in the chart and measured against the y-axis scale on the left-hand side of FIG. 9. Because the sensitivity of the receiver is effectively reduced by the adjustment of the receiver threshold in the medium and short-range settings 904, 903, but not in the long-range setting 905, the Effective Excess Signal Factor is the same as the Excess Signal Factor when the receiver is configured in the long-range setting 905, but is lower than the Excess Signal Factor when the receiver is configured in the medium-range setting 904 or short-range setting 903. The Reflection Threshold Factor 902 (represented by the continuous gray line and measured using the y-axis scale on the right-hand side of FIG. 9) is a value representing the relative amount of light received by the receiver that is reflected off of a 90% white card disposed in the path of the beam. To prevent a potential problem with the receiver detecting reflected light, the Reflection Threshold Factor 902 should be less than 1.0, with lower readings being less likely to cause reflection-related issues. As can be seen in FIG. 9, the three range settings of the object detection system 115 correlate roughly to the following distance ranges: short-range setting 903 for distances between 3 to 30 feet, medium-range setting 904 for distances between 30 feet to 65 feet, and long-range setting 905 for distances between 65 feet to 90 feet (and beyond).

These ranges are approximate, and can vary from installation to installation due to differences in the environment in which the object detection system is installed, including the height of the emitter 116 and receiver 117 off of the ground, the amount and type of ambient light, the materials surrounding the object detection system 115 and their reflectivity, such as any walls and the floor below the system 115, and/or weather conditions. The hysteresis of the object detection system 115 may also affect the ranges as well. In particular, if the emitter 116 and receiver 117 are moved from being close together to further apart (such as during the install mode in which the range setting may be increased by the receiver), the distances encompassed by the three ranges may vary slightly from when the sensors are being moved closer together, such as shown in FIG. 9. In another embodiment, the object detection system 115 has a short-range setting 903 extending between 3-20 feet, a medium-range setting 904 extending from 20-60 feet, and a long-range setting 905 extending from 60 to 140 feet.

In general, FIG. 9 illustrates that within each range setting of the object detection system 115, the Effective Excess Signal Factor or signal strength increases as the distance between the emitter 116 and receiver 117 decreases. For example, as the emitter 116 and receiver 117 are moved from ninety feet apart to seventy feet apart in the long-range setting 905, the Effective Excess Signal Factor increases from approximately 21 to 31. As the emitter 116 and receiver 117 are moved closer together from seventy feet, the receiver 117 automatically reduces its sensitivity by shifting to a threshold for the medium-range setting 904. As the sensors are moved closer together from 65 feet to 35 feet in medium-range setting 904, the Effective Excess Signal Factor 901 increases from approximately 15 to 32. As the emitter 116 and receiver 117 are moved yet closer together, the receiver 117 again reduces its sensitivity by shifting to a threshold for the short-range setting or mode 903.

As can be seen, the Reflection Threshold Factor increases from a value of 0 at a distance of ninety feet to approximately 0.25 at seventy feet in the long-range setting 905. When the object detection system range shifts to the medium-range setting 904, the Reflection Threshold Factor falls to 0.2 at sixty-five feet, and increases to approximately 0.64 at thirty-five feet. When the range shifts to the short-range setting 903, the Reflection Threshold Factor falls to approximately 0.2 at thirty feet and then increases to approximately 0.35 at three feet. Thus, the object detection system 115 maintains both sufficient signal strength (Effective Excess Signal Factor) and sensitivity while keeping the Reflection Threshold Factor at a relatively low level, minimizing the risk of the receiver 117 detecting reflected light from an obstruction between the emitter 16 and receiver 117 and the system 115 incorrectly ignoring the obstruction.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass only A, only B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. An object detection system comprising:
   an emitter configured to emit an infrared signal;
   a receiver configured to detect the infrared signal;
   wherein the object detection system includes an installation mode and an operation mode distinct from the installation mode, the installation mode facilitating both of an increase and a decrease of a received-signal threshold of the receiver without user intervention, and the operation mode facilitating the increase of but not the decrease of the received-signal threshold of the receiver without user intervention;
   wherein the object detection system transitions from the operation mode to the installation mode based on a user-intervention event; and
   wherein the user-intervention event includes a predetermined number of sequential instances of obstruction of the infrared signal and clearance of the obstruction within a predetermined period of time.

2. The object detection system of claim 1, wherein a transition from the installation mode to the operation mode occurs based on at least one of:
   a predetermined duration of time that follows a power-up of the object detection system; and
   a predetermined number of power cycles that follow the power-up of the object detection system.

3. The object detection system of claim 1, wherein the predetermined number is in a range of three to fifteen.

4. The object detection system of claim 1, wherein the receiver comprises a user interface configured to provide information regarding a status of the object detection system.

5. The object detection system of claim 4, wherein the user interface includes a color-changing light or a plurality of lights with one of the plurality of lights having a different color than another of the plurality of lights.

6. The object detection system of claim 5, wherein the color-changing light or the plurality of lights includes a light emitting diode.

7. The object detection system of claim 4, wherein the status indicated by the user interface is at least one of:
   a current setting for the received-signal threshold;

a detected signal strength of the infrared signal detected by the receiver;

a presence or absence of an obstacle between the emitter and the receiver; and a fault condition.

8. The object detection system of claim 1, wherein the received-signal threshold corresponds to a range of distances between the emitter and the receiver, the range being one of a plurality of ranges.

9. The object detection system of claim 8, wherein the plurality of ranges includes a short range corresponding to a first received-signal threshold setting, a middle range corresponding to a second received-signal threshold setting, and a long range corresponding to a third received-signal threshold setting.

10. The object detection system of claim 1, wherein the emitter and the receiver are configured to be positioned on opposite sides of a movable barrier.

11. The object detection system of claim 1, wherein the emitter and the receiver are configured to be positioned on a same side of a movable barrier, the object detection system further comprising a reflector configured to be positioned on an opposite side of the movable barrier to reflect the infrared signal back to the receiver.

12. The object detection system of claim 1, wherein the received-signal threshold corresponds to a minimum detected signal strength of the infrared signal that causes the receiver to determine that no object is present between the emitter and receiver and wherein a decrease in the detected signal strength below the received-signal threshold causes the receiver to determine that an object is present between the emitter and the receiver.

13. The object detection system of claim 1, wherein in the operation mode the object detection system determines a signal strength of the infrared signal and increases the received-signal threshold of the receiver upon the signal strength of the infrared signal being greater than a predetermined signal strength.

14. The object detection system of claim 1, wherein the received-signal threshold of the receiver corresponds to a maximum signal strength that causes the receiver to indicate a presence of an object between the emitter and the receiver.

15. An object detection system comprising:
an emitter configured to emit an infrared signal; and
a receiver configured to detect the infrared signal;
wherein the system includes a received-signal threshold that is at least one of resettable and adjustable based on detection of a user-intervention event comprising a predetermined number of sequential instances of obstruction of the infrared signal and clearance of the obstruction within a predetermined period of time.

16. The object detection system of claim 15, wherein the predetermined number is in a range of three to fifteen.

17. The object detection system of claim 15, wherein at least one of the emitter and the receiver is configured with an installation mode and an operation mode distinct from the installation mode, the installation mode configured to both increase and decrease the received-signal threshold, and the operation mode configured to increase but not decrease the received-signal threshold.

18. The object detection system of claim 17, wherein a transition from the installation mode to the operation mode occurs based on at least one of:
a predetermined duration of time that follows a power-up of the object detection system; and
a predetermined number of power cycles that follow the power-up of the object detection system.

19. The object detection system of claim 18, wherein the object detection system transitions from the operation mode to the installation mode based on a second user-intervention event.

20. The object detection system of claim 19, wherein the second user-intervention event includes a second predetermined number of instances of obstruction of the infrared signal and clearance of the obstruction.

21. The object detection system of claim 15, wherein the receiver comprises a user interface configured to provide information regarding a status of the object detection system.

22. The object detection system of claim 21, wherein the user interface includes a color-changing light or a plurality of lights with one of the plurality of lights having a different color than another of the plurality of lights.

23. The object detection system of claim 21, wherein the status indicated by the user interface is at least one of:
a current setting for the received-signal threshold;
a detected signal strength of the infrared signal detected by the receiver;
a presence or absence of an obstacle between the emitter and the receiver; and
a fault condition.

24. The object detection system of claim 15, wherein the received-signal threshold corresponds to a range of distances between the emitter and the receiver, the range being one of a plurality of ranges.

25. The object detection system of claim 24, wherein the plurality of ranges includes a short range corresponding to a first received-signal threshold setting, a middle range corresponding to a second received-signal threshold setting, and a long range corresponding to a third received-signal threshold setting.

26. The object detection system of claim 15, wherein the emitter and the receiver are configured to be positioned on opposite sides of a movable barrier.

27. The object detection system of claim 15, wherein the emitter and the receiver are configured to be positioned on a same side of a movable barrier, the object detection system further comprising a reflector configured to be positioned on an opposite side of the movable barrier to reflect the infrared signal back to the receiver.

28. A method of automatically adjusting an obstacle detection system having an emitter and a receiver, the method comprising:
detecting by the receiver a signal strength of an infrared signal emitted by the emitter;
comparing the signal strength of the detected infrared signal to a received-signal threshold setting which corresponds to a minimum signal strength that causes the receiver to indicate a presence of an object between the emitter and the receiver;
increasing or decreasing the received-signal threshold setting in an installation mode of the obstacle detection system based on the comparison of the signal strength of the infrared signal to the received-signal threshold setting; and
transitioning the obstacle detection system from the installation mode to an operation mode in which the received-signal threshold setting can be increased but not decreased.

29. The method of claim 28, further comprising:
transitioning the obstacle detection system from the operation mode to the installation mode upon detection of a user intervention event comprising a predetermined number of sequential instances of obstruction of the infrared signal and clearance of the obstruction.

30. The method of claim 28, further comprising transitioning the obstacle detection system from the installation mode to the operation mode based on at least one of:
a predetermined duration of time that follows a power-up of the obstacle detection system; and
a predetermined number of power cycles that follow the power-up of the obstacle detection system.

31. A method of automatically adjusting an obstacle detection system having an emitter and a receiver, the method comprising:
detecting by the receiver a signal strength of an infrared signal emitted by the emitter;
comparing the signal strength of the detected infrared signal to a received-signal threshold setting which corresponds to a maximum signal strength that causes the receiver to indicate a presence of an object between the emitter and the receiver;
increasing or decreasing the received-signal threshold setting in an installation mode of the obstacle detection system based on the comparison of the signal strength of the infrared signal to a predetermined signal strength; and
transitioning the obstacle detection system from the installation mode to an operation mode in which the received-signal threshold setting can be increased but not decreased.

32. The method of claim 31, further comprising:
transitioning the obstacle detection system from the operation mode to the installation mode upon detection of a user intervention event comprising a predetermined number of sequential instances of obstruction of the infrared signal and clearance of the obstruction within a predetermined period of time.

33. The method of claim 31, further comprising transitioning the obstacle detection system from the installation mode to the operation mode based on at least one of:
a predetermined duration of time that follows a power-up of the obstacle detection system; and
a predetermined number of power cycles that follow the power-up of the obstacle detection system.

34. An object detection system comprising:
an emitter configured to emit an infrared signal;
a receiver configured to detect the infrared signal;
wherein the object detection system includes an installation mode and an operation mode distinct from the installation mode, the installation mode facilitating both of an increase and a decrease of a received-signal threshold of the receiver without user intervention, and the operation mode facilitating the increase of but not the decrease of the received-signal threshold of the receiver without user intervention; and
wherein the received-signal threshold corresponds to a range of distances between the emitter and the receiver, the range being one of a plurality of ranges.

35. The object detection system of claim 34, wherein the plurality of ranges includes a short range corresponding to a first received-signal threshold setting, a middle range corresponding to a second received-signal threshold setting, and a long range corresponding to a third received-signal threshold setting.

36. The object detection system of claim 34, wherein a transition from the installation mode to the operation mode occurs based on at least one of:
a predetermined duration of time that follows a power-up of the object detection system; and
a predetermined number of power cycles that follow the power-up of the object detection system.

37. The object detection system of claim 34, wherein the object detection system transitions from the operation mode to the installation mode based on a user-intervention event.

38. The object detection system of claim 37, wherein the user-intervention event includes a predetermined number of sequential instances of obstruction of the infrared signal and clearance of the obstruction within a predetermined period of time.

39. The object detection system of claim 38, wherein the predetermined number is in a range of three to fifteen.

40. The object detection system of claim 34, wherein the receiver comprises a user interface configured to provide information regarding a status of the object detection system.

41. The object detection system of claim 40, wherein the user interface includes a color-changing light or a plurality of lights with one of the plurality of lights having a different color than another of the plurality of lights.

42. The object detection system of claim 41, wherein the color-changing light or the plurality of lights includes a light emitting diode.

43. The object detection system of claim 40, wherein the status indicated by the user interface is at least one of:
a current setting for the received-signal threshold;
a detected signal strength of the infrared signal detected by the receiver;
a presence or absence of an obstacle between the emitter and the receiver; and
a fault condition.

44. The object detection system of claim 34, wherein the emitter and the receiver are configured to be positioned on opposite sides of a movable barrier.

45. The object detection system of claim 34, wherein the emitter and the receiver are configured to be positioned on a same side of a movable barrier, the object detection system further comprising a reflector configured to be positioned on an opposite side of the movable barrier to reflect the infrared signal back to the receiver.

46. The object detection system of claim 34, wherein in the operation mode the object detection system determines a signal strength of the infrared signal and increases the received-signal threshold of the receiver upon the signal strength of the infrared signal being greater than a predetermined signal strength.

* * * * *